United States Patent [19]

Buckholz, Jr. et al.

[11] Patent Number: 4,943,697
[45] Date of Patent: Jul. 24, 1990

[54] MICROWAVE APPARATUS FOR BAKING AND BROWNING FOODSTUFF

[75] Inventors: Lawrence L. Buckholz, Jr., Middletown; Brian Byrne, East Brunswick; Marion A. Sudol, Boonton, all of N.J.

[73] Assignee: International Flavors & Fragrances Inc., New York, N.Y.

[21] Appl. No.: 440,794

[22] Filed: Nov. 24, 1989

Related U.S. Application Data

[60] Division of Ser. No. 356,503, May 25, 1989, Pat. No. 4,904,490, which is a continuation-in-part of Ser. No. 295,450, Jan. 10, 1989, Pat. No. 4,882,184.

[51] Int. Cl.$^5$ .................................................. H05B 6/68
[52] U.S. Cl. ........................ 219/10.55 B; 219/10.55 E; 426/243; 99/451
[58] Field of Search .................. 219/10.55 E, 10.55 B, 219/10.55 R, 10.55 M, 10.55 A; 426/243, 305, 549, 523; 99/451, 443 R

[56] References Cited

U.S. PATENT DOCUMENTS

| | | | |
|---|---|---|---|
| 4,342,788 | 8/1982 | Clatfelter | 426/243 |
| 4,396,817 | 8/1983 | Eck et al. | 219/10.55 M |
| 4,447,693 | 5/1984 | Buck | 219/10.55 B |

Primary Examiner—Philip H. Leung
Attorney, Agent, or Firm—Arthur L. Liberman

[57] ABSTRACT

Described is apparatus useful in enabling the making of a cooked baked goods foodstuff and in enabling a process to be carried out whereby a Maillard reactant-coated uncooked foodstuff is exposed to microwave radiation for a time sufficient to provide a browned baked goods foodstuff which is cooked in a relatively short period of time. The apparatus comprises:

(i) first mixing device for mixing a fluid carrier and Maillard or Amadori reactants;
(ii) second mixing device separate from the first mixing device for mixing dough;
(iii) shaping device downstream from the second mixing device for shaping the mixed dough;
(iv) coating device for coating the composition of (i) onto the shaped dough;
(v) microwave cooking device downstream from the coating device to cook the coated shaped dough; and
(vi) device for controlling the microwave cooking device to determine the cooking time and to stop the microwave cooking at the expiration of the cooking time defined according to specific mathematical equations.

1 Claim, 2 Drawing Sheets

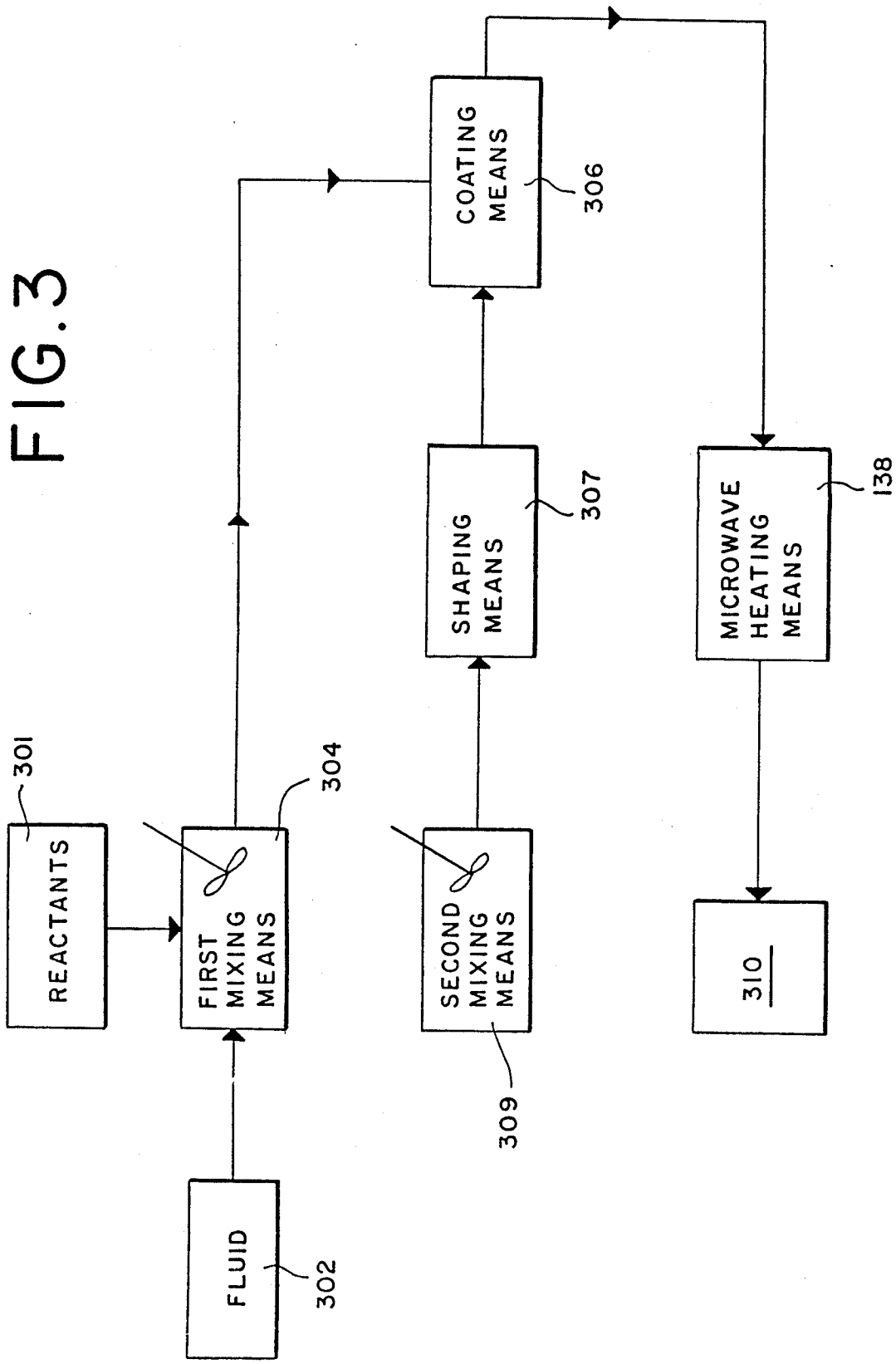

MICROWAVE APPARATUS FOR BAKING AND BROWNING FOODSTUFF

Prior Relevant Patent Applications and Issued Patents

This application is a divisional of Application for U.S. Letters Patent, Ser. No. 356,503 filed on May 25, 1989, now U.S. Pat. No. 4,904,490 issued on Feb. 27, 1990, which, in turn, is a continuation-in-part of Application for U.S. Letters Patent, Ser. No. 295,450 filed on Jan. 10, 1989, now U.S. Pat. No. 4,882,184 issued on Nov. 21, 1989.

BACKGROUND OF THE INVENTION

The increased use of microwaves for cooking has given rise to a large market in microwavable foods. While the advantage of microwave cooking over convection oven cooking is the time savings, the disadvantage is that baked goods and meats do not develop the surface browning or crust formation expected with convection oven cooking.

Our objective has been to create that browning which enhances the products appearance, making it look as if it were cooked in a convection oven.

In the microwave, food does not have sufficient time or temperature for the chemicals responsible for browning to react. Therefore, for a microwave browning system to work, it must accelerate the rate of the browning reactions or locally increase the surface temperature. Ultimately, the reactions responsible for browning have to be accomplished in the relatively short time frame dictated by the foods preparation conditions. The times needed for preparing microwave foods vary depending upon the power output of the microwave unit and the mass of the food to be cooked. A typical 750 watt microwave will cook baked goods in 40 seconds to 4 minutes, while meat will take 6 to 15 minutes.

Several additional requirements for a successful microwave browning system are as follows:
1. in addition to the desired browning effect, it must generate either no aroma or one which is compatible with the target food.
2. the browning reaction must not take place before cooking the food.
3. after cooking, the browning must stop, and not darken substantially.

The reactions responsible for browning during convection oven cooking are the caramelization of sugars and the Maillard reaction between naturally occurring reducing sugars, amino acids, amines, peptides and proteins which results in the formation of colored melanoidins. Until recently (1984) there were numerous patent and literature references to such reactions for the production of flavors, where the generation of color was inconsequential or objectionable. In the past few years several patents have appeared wherein microwave browning created by Maillard reactions have been the topic.

Although the prior art does take advantage of the reaction between reducing sugars and amino acids, it has not made any correlation of reaction rates needed for browning reactions with reaction variables such as pH, solvent, or sugar reactivity.

BRIEF DESCRIPTION OF THE DRAWINGS

FIG. 3 is a block flow diagram showing the steps, in schematic form for carrying out the process of our invention; and indicating the multiple means (apparatus elements) useful in carrying out the process of our invention.

SUMMARY OF THE INVENTION

Figure 1:
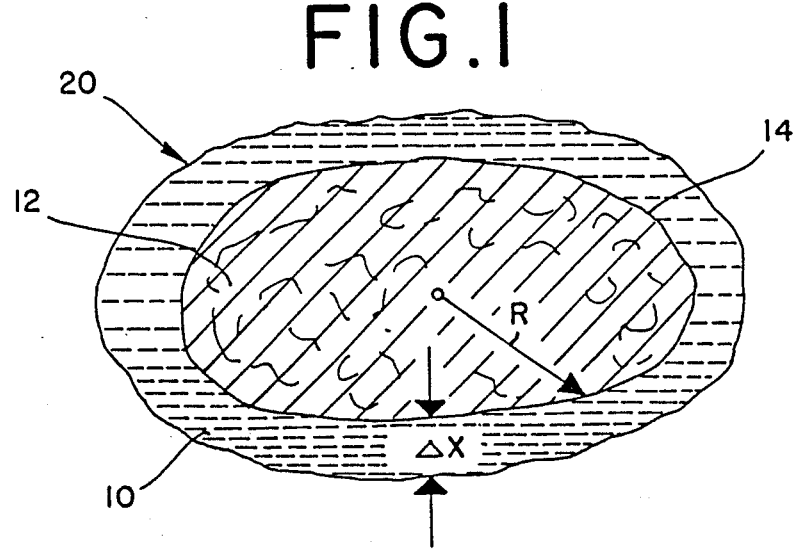
FIG. 1 is a cut-away side elevation view of a coated food article prior to carrying out the microwave browning step of the process of out invention.

Our invention is directed to a process for providing a cooked baked goods foodstuff comprising the steps of:
(a) providing an uncooked baked goods composition having a continuous surface;
(b) providing a mixture of precursors of a Maillard reaction product in a solvent which is capable of raising the dielectric constant of the surface of the foodstuff to be cooked whereby the foodtuff to be cooked is completely cooked in a period of time under 120 seconds;
(c) coating the mixture of (b) onto the surface of the uncooked foodstuff provided in (a); and
(d) exposing the thus coated uncooked foodstuff to microwave radiation for a period of time between 40 seconds and 120 seconds.

Our invention is also directed to the products produced according to such process.

A mathematical model useful in relating each of the variables involved in the development of our invention is set forth thusly:

$$\frac{dQ}{d\theta} = \left\{ \frac{R}{K} + \frac{\mu}{\lambda_1 C_p \rho^2 R^2 (T_2 - T_1)} + \frac{1}{h_A} + \lambda_2 \left[ \frac{T_2 - T_1}{T_2^4 - T_1^4} \right] \right\} E^a \nu \epsilon'$$

In an approximate version an equation for calculating the time of heating as a function of viscosity of the coating (prior to cooking) and further, as a function of the temperature differential between the center of the food article to be cooked and the outer surface of the coating during the microwave browning operation is set forth thusly:

$$\Delta\theta(\text{TIME}) = \frac{\text{TOTAL MICROWAVE ENERGY INPUT, } \Delta Q}{\left( \frac{R}{K} + \frac{\mu}{\lambda_1 C_p \rho^2 R^2 (T_2 - T_1)} + \frac{1}{h_A} + \lambda_2 \left[ \frac{T_2 - T_1}{T_2^4 - T_1^4} \right] \right) E^a \nu \epsilon'}$$

wherein the terms
$\Delta Q$
is the total microwave energy input during the process of our invention;
$dQ/d\theta$
is the rate of heat input equivalent to the rate of energy use by the microwave oven;
R is the effective radius of the food article being cooked;

K
is the heat transfer coefficient of the food article being cooked (the solid material);

$\mu$
is the viscosity of the coating immediately prior to cooking;

$\lambda_1$
is a proportionality constant which is a function of the coating thickness immediately prior to cooking and the geometry of the article being cooked as well as the geometry of the microwave oven;

$C_p$
is the heat capacity of the coating immediately prior to cooking;

$\rho$
is the density of the liquid coating immediately prior to cooking;

$T_1$
the temperature at the center of the food article being cooked;

$T_2$ is the temperature at the outer surface of the food article being cooked;

$h_A$
is the convection heat transfer coefficient for the air layer surrounding the food article being cooked;

$\lambda_2$
proportionality constant for radiation term for concentric spheres (the coating surrounding the uncooked food);

E
electric field strength;

$\nu$
frequency;

$\epsilon^1$
relative dielectric constant of coating material;

$\Delta\theta$
time of microwave cooking.

The foregoing equations were derived from equations set forth in:

"Heat Transfer And Food Products", Hallstrom, et al, Elsevier Applied Science Publishing Company, 1988;

"Principals of Chemical Engineering", Walker, et al, Third Edition, McGraw Hill Book Company, 1937; and "Chemical Engineer's Handbook", Fifth Edition, Perry and Chilton, McGraw Hill Book Company, pages 10-10, 10-11 and 10-12.

DETAILED DESCRIPTION OF THE INVENTION

Our invention has shown that the order of sugar reactivities observed for the typical thermally induced Amadori and Maillard reactions holds true in microwave cooking. As expected, pentoses were more reactive than hexoses and 6-deoxyhexoses more reactive than hexoses.

Unexpectedly, there is a strong relationship between pH and reactivity. At pH's in the range of 9-13, the browning reaction was accelerated relative to at acid pH's. Such a rate enhancement is attributed to the removal of a proton from the amino acid, leaving the amino group unprotonated and, therefore, more nucleophilic. The consequence of the latter is to accelerate the nucleophilic substitution of the amino group on the carbonyl of the reducing sugar. Since this reaction is the first step in the formation of color, it can be concluded that this is the rate determining step to melanoidins. In food applications, the pH is adjusted to a range of 9-13 by the addition of sodium bicarbonate, although any base would achieve the same effect.

Another unexpected finding is that the solvent in which the Maillard browning is run dramatically effects the rate of browning. Aprotic solvents, such as triacetin and vegetable oil, were useless in browning reaction systems since the reactants are not soluble in the solvent. Polar protic solvents are amongst the solvents in which the reactants are soluble; however, not all members of this solvent class are useful for microwave browning. Both water and ethanol are unacceptable as solvents since the rate of the browning reaction in these solvents is on the order of hours. In propylene glycol and glycerine the rate of browning is rapid, achieving the desired coloration in 40 seconds to 2 minutes (120 seconds).

The mechanism of solvent action is believed to be twofold. First, the ability of the solvent to solubilize the reactants is essential; however, that in itself is insufficient to qualify a solvent without the second property. The successful solvent has the ability to absorb microwave radiation (2450 MHz) and retain this absorbed energy as heat. Solvents with heat capacities, high viscosities and low thermal conductivities are desirable, as they facilitate heat retention. With the above properties, the solvent effectively focuses part of the microwave radiation on the foods surface, locally raising the temperature and accelerating the browning reaction. Propylene glycol and glycerine are two materials which meet the necessary requirements as microwave browning solvents.

Examples of Maillard reaction products useful in the practice of our invention are as follows:

(a) reaction products of amino acids and sugars as described in U.S. Pat. No. 4,735,812 issued on Apr. 5, 1988, the specification of which is incorporated herein by reference;

(b) reaction product of a monosaccharide and/or a disaccharide and an amino acid as described in U.S. Pat. No. 4,547,377 issued on Oct. 15, 1985, the specification of which is incorporated by reference herein;

(c) Amadori products as described in Chem.Abstracts, Volume 109:169074g as set forth below:

109: 169074 g Studies of the Maillard reaction. Part 15. Derivatographic studies of the systems D-glucose/glycine, alanine, phenylalanine and the corresponding Amadori products. Westphal. G.; Oersi, F.; Kroh, L. (Sekt. Nahrungsguterwirtsch. Lebensmitteltechnol., Humboldt-Univ., Berlin, Ger. Dem. Rep.). Nahrung 1988, 32(2), 109-16 (Ger). From results of investigations of the D-glucose/DL-phenylalanine (1:1) model it was possible to classify under the chosen conditions the reaction into an earlier phase with a temp. of 130°, a developed phase at 130°-150° and the beginning of the final phase of the Maillard reaction at >150°, whereby insol. polymers were formed. The loss of carbohydrates and amino acids caused by thermal changes can be detd. by HPLC. A comparative study of the derivatograms of the 3 model systems (D-glucose with glycine, DL-alanine, and OL-phenylalanine) with their corresponding Amadori products shows the thermal instability of the Amadori compds. depended on the aglycon. The extremely small endothermal enthalpy values (DTA curves) of the reaction products supports this assumption.

and (d) flavor compounds which are Amadori rearrangement compounds of 6-deoxy-aldohexoses such as rhamnose and alpha amino acids such as proline as described in detail in U.S. Pat. No. 4,022,920 issued on May 10, 1977, the specification of which is incorporated herein by reference.

With respect to the sugar components of the reactants in the coating, indicated by reference numeral 10 in FIG. 1, the preferred order of use is as follows (in descending order):

(i) ribose;
(ii) rhamnose and other 6-deoxyhexoses;
(iii) glucose.

It should be noted that fructose is not preferred since off odors are produced when using the fructose.

With respect to the amino acid component of the reaction material, lysine and proline are preferred; but glycine and alanine are not recommended. Dimethylanthranilate having the structure:

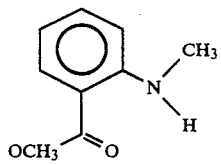

and secondary amino acids and diamino acids in general are preferred. Thus, lysine having the structure:

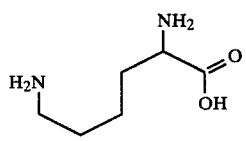

is a preferred material as set forth, supra, and proline having the structure:

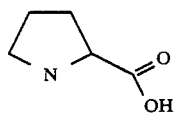

is a preferred material. Also useful are dipeptides.

Referring now to the drawings, FIG. 1 is a cut-away side elevation view of the coated food article prior to cooking. The overall article is indicated by reference numeral 20. The uncooked baked goods material is indicated by reference numeral 12 having an effective radius "R". The coating containing the mixture of precursors of a maillard reaction product in a solvent which is capable of raising the dielectric constant of the surface of the foodstuff 12 to be cooked whereby the foodstuff to be cooked is completely cooked in a period of time under 120 seconds is indicated by reference numeral 10. The coating is located on the surface of the food article 12 and reference numeral 14 indicates the surface of the uncooked baked goods composition. The term "ΔX" is the thickness of the coating prior to microwave cooking.

Figure 2:
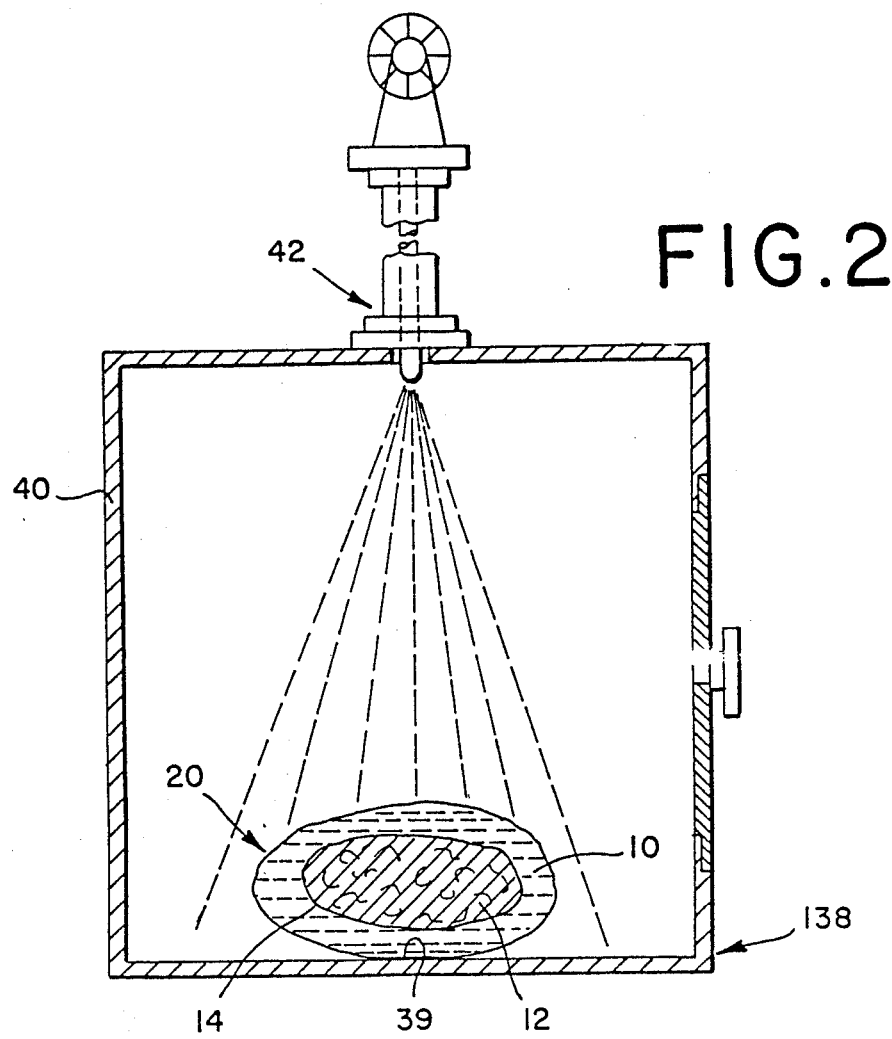
FIG. 2 is a cut-away side elevation view (in schematic form) of a microwave oven containing a coated food article prior to and during the carrying out of the process of our invention.

FIG. 2 is a schematic diagram of the coated food article in a microwave oven during the carrying out of the process of our invention. The food article 20 having the coating 10 on the uncooked baked goods (solid) 12 is contained in microwave oven 138, more specifically in box 40 wherein microwave source 42 emits energy substantially perpendicular to the upper surface of the food article 20. The microwave energy passes through the coating surface and causes the reaction in coating 10 to take place whereby Maillard or Amadori reaction products are produced. The syrup 10 heats up and activates the molecules of the reactants. Simultaneously, the solid material 12 (the uncooked baked goods) is heated and the coating 10 is adsorbed through the surface 14 into the outer interstices of the baked goods article 12. Prior to 120 seconds the entire baked goods article 12 is cooked and the surface coating now containing the Amadori or Maillard reaction product is substantially adsorbed into the outer interstices of the baked goods article.

The food article 20 rests at point 39 in box 40.

FIG. 3 sets forth a schematic block flow diagram of the process of our invention whereby fluid, e.g., glycerine heated at 302 and reactants, amino acids and sugars at location 301 are mixed in mixing means 304. The resulting coating is utilized at coating means 306. Dough is mixed at mixing means 309 and shaped into pre-cooked uncoated food articles at shaping means 307. The shaped dough is then transported to coating means 306 where the fluid from 304 is coated onto the shaped pre-cooked food articles. The now coated shaped precooked food articles are cooked in microwave means 138 using microwave source 42. The resulting cooked articles are then transported for marketing to location 310.

In summary, the solvents useful in carrying out our invention have dielectric constants which cause the cooking via microwave radiation to take place in under 120 seconds (in the range of from about 40 seconds up to about 120 seconds).

The principles given above are illustrative in the following examples.

Example I

Into 100 ml beakers were placed exactly 40.4 g of solvent. Each beaker was irradiated with 2450 MHZ microwave radiation for 20 seconds, afterwhich the solvents temperature was measured. Experiments were run in triplicate. The results for several solvents are set forth in the following Table I.

TABLE I

| SOLVENT | TEMPERATURE (C) |
|---|---|
| Propylene glycol | 91 |
| Glycerine | 88 |
| Ethanol | 78 |
| Water | 61 |
| Triacetin | 80 |

EXAMPLE II

Blotters weighing 0.61 g were dosed with 0.10 of test solutions. The test solution was placed on the center of the blotter. Blotters spotted in this manner were irradiated with 2450 MHz microwave (750 watts) radiation for various periods of time, starting at 20 seconds. The results of testing variables are summarized in Tables II(A), II(B) and II(C).

The microwave radiation source is a 750 watt Amana RADARANGE ® Microwave Oven.

| EXAMPLE | Amino Acid | Amino Acid Wt. | Sugar | Sugar Wt. | Solvent | Solvent Wt. | pH | pH ADJ Agent | pH ADJ Agent Wt. | Microwave Time | Color Appearance | Aroma |
|---|---|---|---|---|---|---|---|---|---|---|---|---|
| | | | | | EXAMPLE II(A) | | | | | | | |
| II-1 | Proline | 3.7 g | Rhamnose | 5.3 g | Ethanol | 16 g | 7–8 | NaHCO$_3$ | 2.7 g | 80 sec. | White | None |
| II-2 | Proline | 3.7 g | Rhamnose | 5.3 g | Ethanol Glycerine | 16 g 25 g | 7–8 | NaHCO$_3$ | 2.7 g | 40 sec. 20 sec. | Burnt Brown Golden Brown | Burnt Crusty Bready Sweet |
| II-3 | Proline | 3.7 g | Rhamnose | 5.3 g | Ethanol | 16 g | 6–7 | NaHCO$_3$ HOAc | 2.7 g 2.2 g | 40 sec. 80 sec. 120 sec. | White White White | None None None |
| II-4 | Proline | 3.7 g | Rhamnose | 5.3 g | Ethanol Glycerine | 16 g 25 g | 6–7 | NaHCO$_3$ HOAc | 2.7 g 2.2 g | 20 sec. | Golden Brown | Bready Sweet |
| II-5 | Proline | 3.7 g | Rhamnose | 5.3 g | Ethanol Glycerine | 16 g 50 g | 7–8 | NaHCO$_3$ | 2.7 g | 20 sec. | Golden Brown | Bready Sweet |
| II-6 | Proline | 3.7 g | Rhamnose | 5.3 g | Ethanol Glycerine | 16 g 75 g | 7–8 | NaHCO$_3$ | 2.7 g | 20 sec. | Dark Brown | Bready |
| II-7 | Proline | 3.7 g | Rhamnose | 5.3 g | Ethanol Glycerine | 16 g 175 g | 7–8 | NaHCO$_3$ | 2.7 g | 20 sec. | Golden Brown | Bready |
| II-8 | Proline | 3.5 g | Ribose | 4.5 g | Ethanol | 16 g | 7–8 | NaHCO$_3$ | 2.7 g | 80 sec. | White | None |
| II-9 | Proline | 3.5 g | Ribose | 4.5 g | Ethanol Glycerine | 16 g 25 g | 7–8 | NaHOC$_3$ | 2.7 g | 20 sec. | Dry Dark Brown | Burnt Bready |
| II-10 | Proline | 3.5 g | Ribose | 4.5 g | Ethanol Glycerine | 16 g 50 g | 7–8 | NaHCO$_3$ | 2.7 g | 20 sec. | Dark Brn. Golden | Sweet Bready |
| II-11 | Proline | 3.5 g | Ribose | 4.5 g | Ethanol Glycerine | 16 g 50 g | 6–7 | NaHCO$_3$ HOAc | 2.7 g 5.0 g | 20 sec. | Golden Brown | Sweet Bready |
| | | | | | EXAMPLE II(B) | | | | | | | |
| II-12 | Proline | 3.5 g | Ribose | 4.5 g | Ethanol Triacetin | 16 g 25 g | 7–8 | NaHCO$_3$ | 2.7 g | 80 sec. | White | None |
| II-13 | Proline | 3.5 g | Ribose | 4.5 g | Ethanol Propylene Glycol | 16 g 25 g | 7–8 | NaHCO$_3$ | 2.7 g | 20 sec. 40 sec. 80 sec. | Yellow Dk. Yellow Golden | Slt Sweet Sweet Sweet Bready |
| II-14 | Proline | 3.5 g | Ribose | 4.5 g | Ethanol Water | 16 g 25 g | 7–8 | NaHCO$_3$ | 2.7 g | 20 sec. 40 sec. 80 sec. | White White White | None None None |
| II-15 | Proline | 3.5 g | Ribose | 4.5 g | Ethanol Glycerine | 16 g 25 g | 7–8 | NaHCO$_3$ | 2.7 g 0.1 g | 20 sec. | Same as 9 | |
| | Color of Sample Deterioates To Blood Red After 7 Days; EDTA Added Did Not Prevent This | | | | | | | | | | | |
| II-16 | Proline | 3.5 g | Ribose | 4.5 g | Ethanol Glycerine | 16 g 25 g | 7–8 | NaHCO$_3$ | 2.7 g | 20 sec. | Vry Dark Brown | Burnt Bready |
| | Repeat of 9; Color Deteriorated To Blood Red In 7 Days. | | | | | | | | | | | |
| II-17 | Proline | 3.5 g | Rhamnose | 5.5 g | Ethanol Glycerine | 16 g 75 g | 7–8 | NaHCO$_3$ | 2.7 g | 20 sec. 40 sec. | Drk Brown Drk Golden Brown | Burnt Sugar Sweet Hot Buns |
| II-18 | Proline | 3.5 g | Ribose | 4.5 g | Ethanol Glycerine | 16 g 25 g | | None | | 20 sec. 40 sec. | Yellow Golden | Slt Sweet Slt Sweet |
| | Repeat of 9 Without NaHCO$_3$; Color Remained Yellow After 7 Days. | | | | | | | | | | | |
| II-19 | Proline | 3.5 g | Rhamnose | 5.5 g | Ethanol Glycerine | 16 g 75 g | 7–8 | NaHCO$_3$ | 5.0 g | 20 sec. | Burnt Blackened | Burnt Bread |
| II-20 | Proline | 3.5 g | Rhamnose | 5.5 g | Glycerine | 75 g | 7–8 | NaHCO$_3$ | 2.7 g | 20 sec. | Burnt Blackened | Burnt Bread |
| | | | | | EXAMPLE II(C) | | | | | | | |
| II-21 | Alanine | 2.7 g | Ribose | 4.5 g | Ethanol Glycerine | 16 g 25 g | 7–8 | NaHCO$_3$ | 2.7 g | 20 sec. | Dark Brn | Crusty Burnt |
| II-22 | Alanine | 2.7 g | Rhamnose | 5.5 g | Ethanol Glycerine | 16 g 75 g | 7–8 | NaHCO$_3$ | 2.7 g | 20 sec. 40 sec. | Golden Lite Brn. | Sugary Sug-cookie |
| II-23 | Alanine | 2.7 g | Cerelose | 5.5 g | Ethanol Glycerine | 16 g 25 g | 7–8 | NaHCO$_3$ | 2.7 g | 20 sec. 40 sec. | Lite Brn Black | None Burnt Crust |
| II-24 | Lysine | 4.4 g | Ribose | 4.5 g | Ethanol Glycerine | 16 g 25 g | 7–8 | NaHCO$_3$ | 2.7 g | 20 sec. | Chared Black | Badly Burnt |
| II-25 | Lysine | 4.4 g | Rhamnose | 5.5 g | Ethanol Glycerine | 16 g 75 g | 7–8 | NaHCO$_3$ | 2.7 g | 20 sec. | Brown Browner | Crusty Crusty |
| II-26 | Lysine | 4.4 g | Cerelose | 5.5 g | Ethanol Glycerine | 16 g 25 g | 7–8 | NaHCO$_3$ | 2.7 g | 20 sec. | Chared Burnt | Good Crusty |
| II-27 | Proline | 3.5 g | Cerelose | 5.5 g | Ethanol Glycerine | 16 g 25 g | 7–8 | NaHCO$_3$ | 2.7 g | 20 sec. | Drk Brn | Burnt Bread |
| II-28 | Proline | 3.5 g | Fructose | 5.5 g | Ethanol Glycerine | 16 g 25 g | 7–8 | NaHCO$_3$ | 2.7 g | 20 sec. | Drk Brn | Cooked Pancake |
| II-29 | Proline | 3.5 g | Fructose | 5.5 g | Ethanol Glycerine | 16 g 50 g | 7–8 | NaHCO$_3$ | 2.7 g | 20 sec. | Drk Brn Less Than 28 | Plastic |
| II-30 | Glycine | 2.3 | Ribose | 4.5 g | Ethanol Glycerine | 16 g 25 g | 7–8 | NaHCO$_3$ | 2.7 g | 20 sec. | Drk Brn | Sweet Bready |
| II-31 | Glycine | 2.3 | Rhamnose | 5.5 g | Ethanol Glycerine | 16 g 75 g | 7–8 | NaHCO$_3$ | 2.7 g | 20 sec. 40 sec. | Lite Brn Drk Brn | Sweet Swt Crust |

-continued

| EXAMPLE | Amino Acid | Amino Acid Wt. | Sugar | Sugar Wt. | Solvent | Solvent Wt. | pH | pH ADJ Agent | pH ADJ Agent Wt. | Microwave Time | Color Appearance | Aroma |
|---|---|---|---|---|---|---|---|---|---|---|---|---|
| II-32 | Glycine | 2.3 | Cerelose | 5.5 g | Ethanol Glycerine | 16 g 25 g | 7-8 | NaHCO$_3$ | 2.7 g | 20 sec. 40 sec. | Brown Brown | None None |

What is claimed is:

1. Apparatus useful in enabling the making of a cooked baked goods foodstuff and in enabling a process to be carried out comprising the steps of:
  (a) providing an uncooked baked goods composition having a continuous surface;
  (b) providing a mixture of precursors of a Maillard or Amadori reaction product in a solvent which is capable of raising the dielectric constant of the surface of the foodstuff to be cooked whereby the foodstuff to be cooked is completely cooked in a period of time under 120 seconds;
  (c) coating the mixture of (b) onto the surface of the uncooked foodstuff provided in (a); and
  (d) exposing the thus coated uncooked foodstuff to microwave radiation for a period of time between 40 seconds and 120 seconds said apparatus comprising:
  (i) first mixing means for mixing a fluid carrier and Maillard or Amadori reactants;
  (ii) second mixing means separate from said first mixing means for mixing dough;
  (iii) shaping means downstream from said second mixing means for shaping the mixed dough;
  (iv) coating means for coating the composition prepared using said first mixing means onto said shaped dough produced according to said shaping means;
  (v) microwave cooking means downstream from said coating means to cook the coated shaped dough in less than 120 seconds; and
  (vi) means for controlling said microwave cooking means to determine the cooking time according to the following mathematical equations and to stop the microwave cooking at the expiration of the cooking time:

$$\frac{dQ}{d\theta} = \left\{ \frac{R}{k} + \frac{\mu}{\lambda_1 C_p \rho^2 R^2 (T_2 - T_1)} + \frac{1}{h_A} + \lambda_3 \left[ \frac{T_2 - T_1}{T_2^4 - T_1^4} \right] \right\} E^a \nu \epsilon^1$$

and $$\Delta\theta(\text{Time}) = \frac{\text{Total Microwave Energy Input, } \Delta Q}{\left\{ \frac{R}{k} + \frac{\mu}{\lambda_1 C_p \rho^2 R^2 (T_2 - T_1)} + \frac{1}{h_A} + \lambda_2 \left[ \frac{T_2 - T_1}{T_2^4 - T_1^4} \right] \right\} E^a \nu \epsilon^1}$$

wherein the terms:
$\Delta Q$ is the total microwave energy input during the process;
$dQ/d\theta$ is the rate of heat input equivalent to the rate of energy use by the microwave cooking means;
R is the effective radius of the food article being cooked;
K is the heat transfer coefficient of the food article being cooked;
$\mu$ is the viscosity of the coating immediately prior to cooking;
$\lambda_1$ is a proportionality constant which is a function of the coating thickness immediately prior to cooking and geometry of the article being cooked as well as the geometry of the microwave cooking means;
Cp is the heat capacity of the coating immediately prior to cooking;
$\rho$ is the density of the liquid coating immediately prior to cooking;
$T_1$ is the temperature at the center of the food article being cooked;
$T_2$ is the temperature at the outer surface of the food article being cooked;
$h_A$ is the convection heat transfer coefficient for the air layer surrounding the food article being cooked;
$\lambda_2$ is a proportionality constant for the radiation term for concentric spheres, the coating surrounding the uncooked food;
E is the electric field strength;
$\nu$ is the frequency;
$\epsilon^1$ is the relative dielectric constant of the coating material; and
$\Delta\theta$ is the time of microwave cooking.

* * * * *